US012606086B2

(12) United States Patent
Lintz

(10) Patent No.: US 12,606,086 B2
(45) Date of Patent: Apr. 21, 2026

(54) DRIVER MONITORING SYSTEM WITH LANE DETECTION

(71) Applicant: Gentex Corporation, Zeeland, MI (US)

(72) Inventor: Joshua D. Lintz, Allendale, MI (US)

(73) Assignee: GENTEX CORPORATION, Zeeland, MI (US)

( * ) Notice: Subject to any disclaimer, the term of this patent is extended or adjusted under 35 U.S.C. 154(b) by 61 days.

(21) Appl. No.: 18/418,667

(22) Filed: Jan. 22, 2024

(65) Prior Publication Data

US 2024/0246483 A1 Jul. 25, 2024

Related U.S. Application Data

(60) Provisional application No. 63/440,475, filed on Jan. 23, 2023.

(51) Int. Cl.
| | |
|---|---|
| *B60Q 9/00* | (2006.01) |
| *B60R 1/12* | (2006.01) |
| *G06V 20/56* | (2022.01) |
| *G06V 20/59* | (2022.01) |
| *H04N 23/20* | (2023.01) |

(52) U.S. Cl.
CPC .................. *B60Q 9/00* (2013.01); *B60R 1/12* (2013.01); *G06V 20/588* (2022.01); *G06V 20/597* (2022.01); *B60R 2001/1253* (2013.01); *H04N 23/20* (2023.01)

(58) Field of Classification Search
CPC ..... B60Q 9/00; B60R 1/12; B60R 2001/1253; G06V 20/588; G06V 20/597; H04N 23/20
See application file for complete search history.

(56) References Cited

U.S. PATENT DOCUMENTS

| | | | | |
|---|---|---|---|---|
| 10,298,741 | B2 * | 5/2019 | Goren ..................... | H04W 4/90 |
| 10,836,309 | B1 * | 11/2020 | Trundle .............. | G08G 1/0116 |
| 11,458,967 | B2 * | 10/2022 | Nath .................... | G06V 20/588 |
| 2012/0154588 | A1 * | 6/2012 | Kim ....................... | G06V 10/48 |
| | | | | 348/148 |
| 2015/0328985 | A1 * | 11/2015 | Kim ....................... | A61B 5/746 |
| | | | | 180/272 |
| 2018/0134217 | A1 * | 5/2018 | Peterson ................ | G08G 1/167 |
| 2019/0184898 | A1 * | 6/2019 | Zheng ................... | B60W 50/14 |
| 2020/0012872 | A1 * | 1/2020 | Autran ................ | B60W 50/082 |
| 2021/0197835 | A1 * | 7/2021 | Maeda .................. | B60W 40/08 |

(Continued)

FOREIGN PATENT DOCUMENTS

| | | |
|---|---|---|
| CN | 112389448 A | 2/2021 |
| KR | 1020150131634 A | 11/2015 |

*Primary Examiner* — Mohamed Barakat
(74) *Attorney, Agent, or Firm* — Price Heneveld LLP; Brian James Brewer

(57) ABSTRACT

A driver monitoring system for a vehicle includes a communication module, and at least one imager module in operable communication with to the communication module that is configured to capture a lane position of the associated vehicle and a driver's behavior. A processor receives the captured lane position and the captured driver's location from the at least one imager module. A memory includes instructions that, when executed by the processor, cause the processor to monitor the captured lane position and the captured driver's behavior for a sign of low alertness of the driver and generate an alert with the communications module upon detecting the sign of low alertness.

20 Claims, 5 Drawing Sheets

(56) References Cited

U.S. PATENT DOCUMENTS

| | | | |
|---|---|---|---|
| 2021/0269045 A1* | 9/2021 | Katz | G02B 27/0093 |
| 2021/0284176 A1* | 9/2021 | Wiesenberg | B60W 40/09 |
| 2021/0316738 A1 | 10/2021 | Iwase et al. | |
| 2021/0323473 A1* | 10/2021 | Peterson | B60R 1/025 |

* cited by examiner

DRIVER MONITORING SYSTEM WITH LANE DETECTION

CROSS-REFERENCE TO RELATED APPLICATION

This application claims priority to and the benefit under 35 U.S.C. § 119(e) of U.S. Provisional Application No. 63/440,475, filed on Jan. 23, 2023, entitled "DRIVER MONITORING SYSTEM WITH LANE DETECTION," the disclosure of which is hereby incorporated herein by reference in its entirety.

FIELD OF THE DISCLOSURE

The present disclosure relates generally to a driver monitoring system and, more particularly, relates to a driver monitoring system that tracks a lane position of a vehicle and monitors a driver's behavior.

SUMMARY OF THE DISCLOSURE

According to one aspect of the present disclosure, a driver monitoring system for a vehicle includes a communication module, and at least one imager module in operable communication with the communication module that is configured to capture a lane position of the associated vehicle and a driver's behavior. A processor receives the captured lane position and the captured driver's location from the at least one imager module. A memory includes instructions that, when executed by the processor, cause the processor to monitor the captured lane position and the captured driver's behavior for a sign of low alertness of the driver and generate an alert with the communications module upon detecting the sign of low alertness.

According to another aspect of the present disclosure, a driver monitoring system for a vehicle includes a communication module, a first imager module, and a second imager module. The first imager module is configured to capture a driver's behavior, and the second imager module is configured to capture a lane position of an associated vehicle. A processor receives the captured lane position and the captured driver's behavior from the first and second imager modules. A memory including instructions that, when executed by the processor, cause the processor to simultaneously monitor the captured lane position and the captured driver's behavior for a sign of low alertness of the driver, and generate one of a plurality of different alerts upon detecting the sign of low alertness, each alert in the plurality of different alerts associated with severity of the sign of low alertness.

According to yet another aspect of the present disclosure, a driver monitoring system for a vehicle includes a communication module and at least one imager module in operable communication with the communication module and configured to capture a lane position of the associated vehicle and a driver's behavior. A light source is configured to generate an illumination within the infrared spectrum directed towards the driver that is captured by the at least one imager module. A processor receives the captured lane position and the captured driver's behavior from the at least one imager module. A memory includes instructions that, when executed by the processor, cause the processor to monitor the captured lane position and the captured driver's behavior for a sign of low alertness of the driver. The processor further generates a first alert upon detecting the sign of low alertness of the captured driver's behavior, and generates a second alert that is different than the first alert upon detecting a sign of low alertness in the captured lane position.

These and other features, advantages, and objects of the present device will be further understood and appreciated by those skilled in the art upon studying the following specification, claims, and appended drawings.

Figure 1:
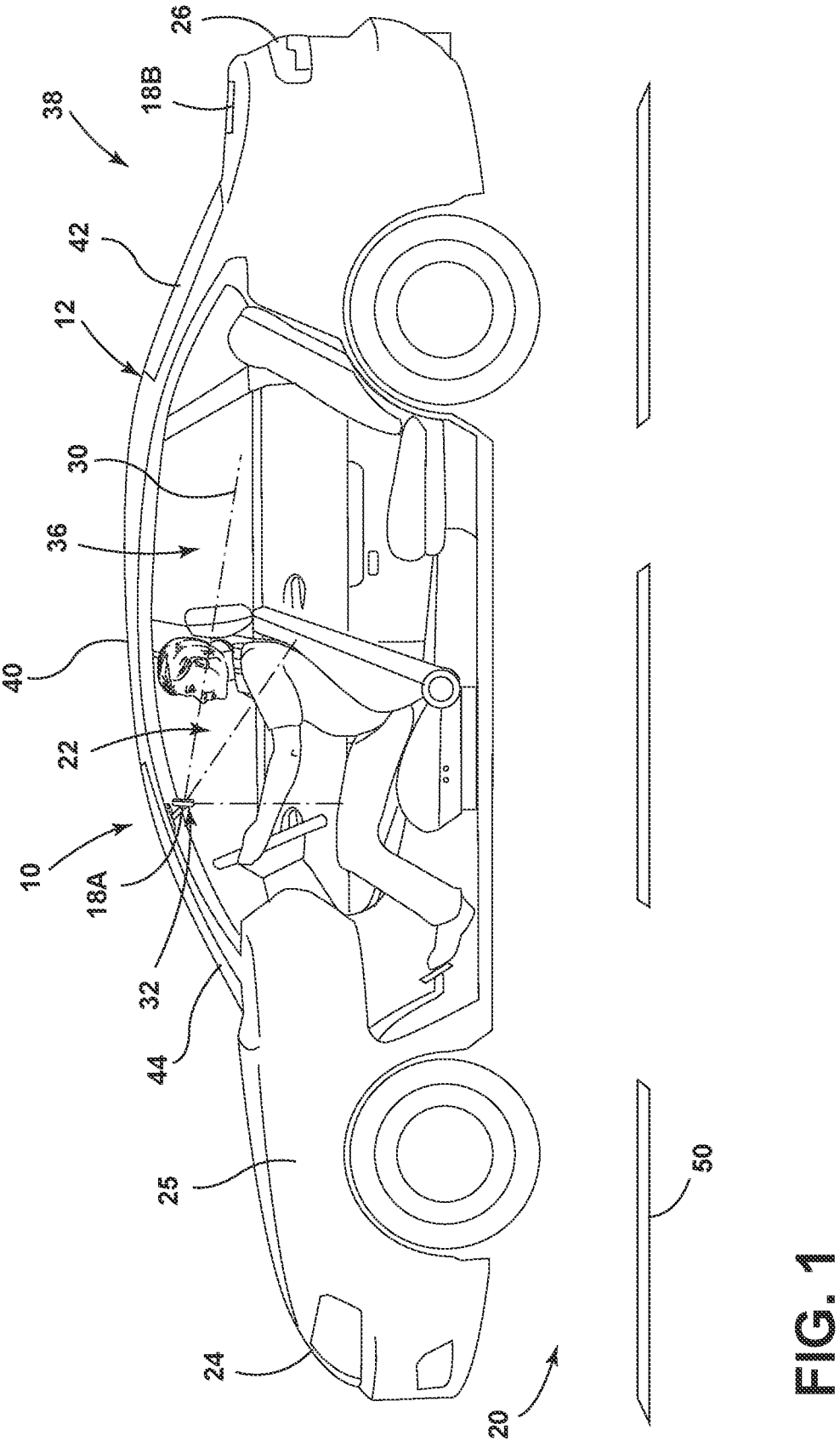
FIG. 1 is a side elevational view of a vehicle that incorporates a monitoring system in accordance with an aspect of the present disclosure.

The components in the figures are not necessarily to scale, emphasis instead being placed upon illustrating the principles described herein.

DETAILED DESCRIPTION OF EMBODIMENTS

The present illustrated embodiments reside primarily in a combination of apparatus components related to a driver monitoring system that tracks a lane position of a vehicle and monitors a driver's behavior. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

For purposes of description herein, the terms "upper," "lower," "right," "left," "rear," "front," "vertical," "horizontal," and derivatives thereof shall relate to the disclosure as oriented in FIG. 1. Unless stated otherwise, the term "front" shall refer to the surface of the element closer to an intended viewer of the driver monitoring system, and the term "rear" shall refer to the surface of the element further from the intended viewer of the driver monitoring system. However, it is to be understood that the disclosure may assume various alternative orientations, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises a . . . " does not, without more constraints, preclude the existence of additional identical elements in the process, method, article, or apparatus that comprises the element.

With reference to FIGS. 1-5, reference numeral 10 generally indicates a driver monitoring system for a vehicle 12 that includes a communication module 16 (FIG. 3), and at least one imager module 18A, 18B in operable communication with to the communication module 16 that is configured to capture a lane position 20 of the vehicle 12 and a driver's location 22. A control system 100 includes a processor 104 and a memory 106 (FIG. 5) that receives the captured lane position 20 and the captured driver's location 22 from the at least one imager module 18A, 18B. The memory 106 includes instructions that, when executed by the processor 104, cause the processor 104 to monitor the captured lane position and the captured driver's behavior for a sign of low alertness of the driver and generate an alert with the communications module upon detecting the sign of low alertness.

Figure 2:
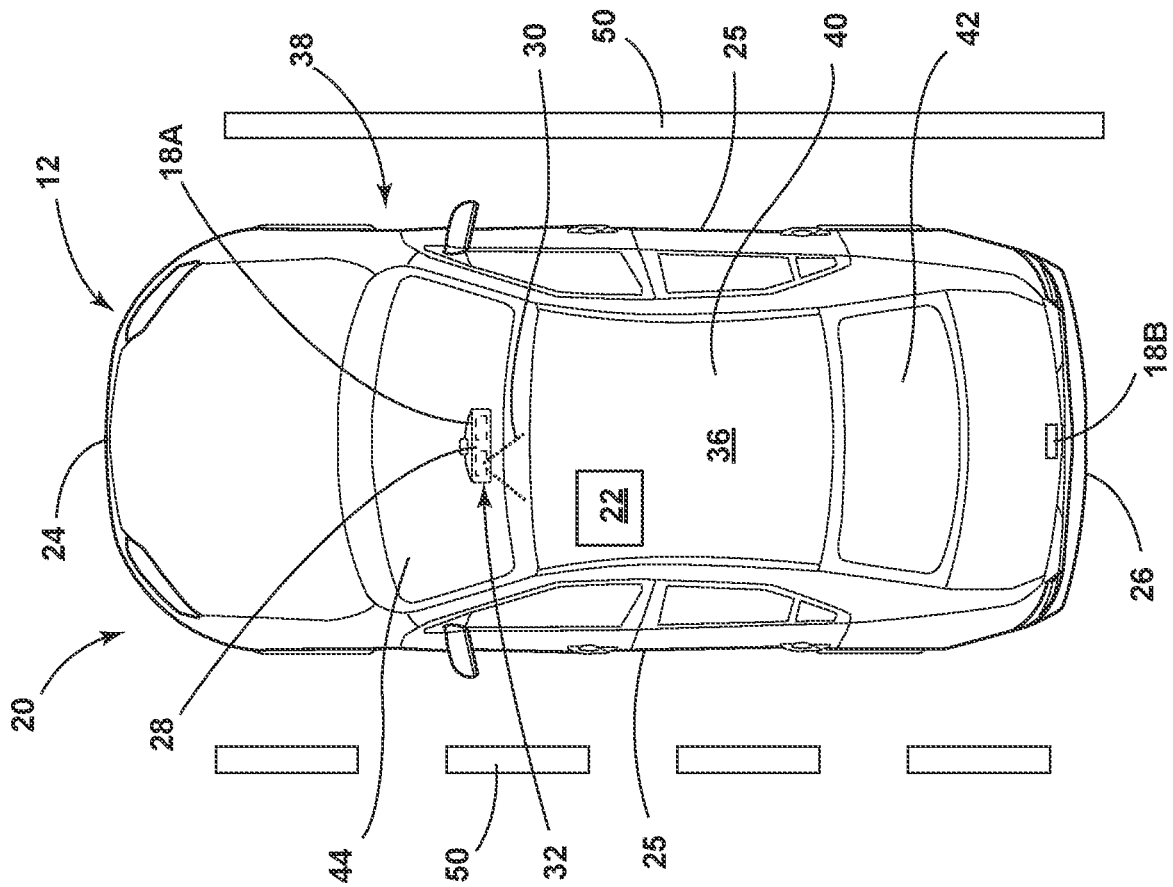
FIG. 2 is a top plan view of a vehicle that incorporates a monitoring system in accordance with an aspect of the present disclosure.

With reference now to FIGS. 1 and 2, the at least one imager module 18A, 18B may include a first imager module 18A and a second imager module 18B. The first imager module 18A may be oriented towards the driver's location 22, and the second imager module 18B may be oriented towards an exterior 38 (e.g., a front 24, side 25, or rear 26) of the vehicle 12. In some embodiments, the second imager module 18B may include a plurality of second imager modules 18B oriented to capture opposite sides 25 of the vehicle 12. The driver monitoring system 10 may further include an illumination source 28 (FIG. 3) configured to generate an illumination 30 (e.g., within the infrared spectrum) towards the driver's location 22. In some embodiments, the illumination 30 may be a flood illumination for extracting two-dimensional information about the driver's behavior. In some embodiments, the illumination 30 is only generated when ambient light levels are low. In some embodiments, the illumination 30 may be a structured light illumination and the control system 100 (e.g., the processor 104) may operate under the principles of Time-of-Flight for extracting three-dimensional ("3D") information about the driver's behavior. However, in other embodiments, the control system 100 (e.g., the processor 104) may operate under the principles for extracting 3D information, such as LiDAR, stereovision, radar, and other types of 3D extraction principles. In still further embodiments, the illumination is sequenced (e.g., non-continuous) with the second imager module 18B.

With continued reference to FIGS. 1 and 2, in some embodiments, at least some of the components of the driver monitoring system 10 are located in a full display rearview mirror assembly 32. For example, the communication module 16, the first imager module 18A, the illumination source 28, and/or the processor 104 may be located within the full display rearview mirror assembly 32. In some embodiments, the second imager module 18B (e.g., the plurality of second imager modules 18B) is located outside of the full display rearview mirror assembly 32, within an interior cabin 36 of the vehicle 12, on an exterior 38 of the vehicle 12, or combinations thereof. For example, the second imager module 18B (e.g., the plurality of second imager modules 18B) may be located on a roof 40, internal or external to a rear window 42, internal or external to a front window 44, and/or in other various positions that permit the second imager module 18B to capture the location of the lane position 20 of the vehicle 12. The first imager module 18A and the second imager module 18B may include a variety of image-capturing technology, such as night mode, image enhancement, thermal recognition, recording capabilities, wide angle lenses, and other types of technologies. For example, in some embodiments, a pair of the second imager modules 18B are oriented towards different sides 25 and may utilize a wide-angle lens.

With continued reference to FIGS. 1 and 2, a first image data 46 from the first imager module 18A and a second image data 48 from the second imager module 18B (e.g., the plurality of second imager modules 18B) may be monitored by the control system 100 (e.g., the processor 104) to detect the sign of low alertness, such as drowsiness, misplaced attention, and/or the like. For example, the driver may have body language, such as head tilting, body posture, eye movement, iris positioning, gaze orientation, that correspond to the sign of low alertness. Likewise, the vehicle 12 position, such as slowly merging into an adjacent lane, swerving over a period of time within a lane (e.g., moving towards and away from an adjacent lane repeatedly over a short period of time), or changing lanes without a turn signal, may correspond to the sign of low alertness. In this manner, the driver monitoring system 10 may detect the sign of low alertness from a combination of characteristics (e.g., movement and position) of the driver and the vehicle 12 simultaneously. In some embodiments, the control system 100 (e.g., the processor 104) may be configured to detect and identify a lane marker 50 (e.g., a center line, or edge line). For example, the control system 100 (e.g., the processor 104) may be configured to determine if the lane that the vehicle 12 is encroaching is a passing lane or non-passing lane (e.g., by the presence and shape of lane marker 50). In some embodiments, the control system 100 (e.g., the processor 104) may be configured to determine if the vehicle 12 is encroaching a center line on a roadway or an edge line on the roadway (e.g., by the shape and/or color of the marking).

Figure 3:
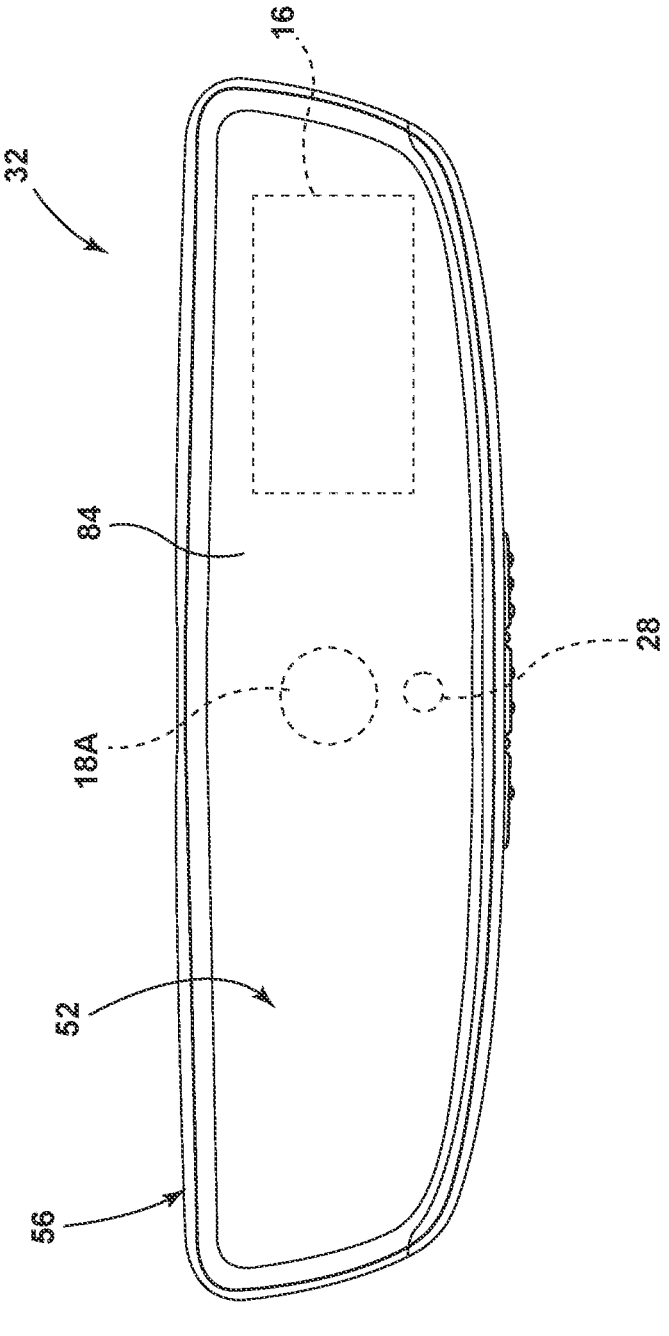
FIG. 3 is a front elevational view of a full display mirror assembly that houses components of a monitoring system in accordance with an aspect of the present disclosure.
Figure 4:
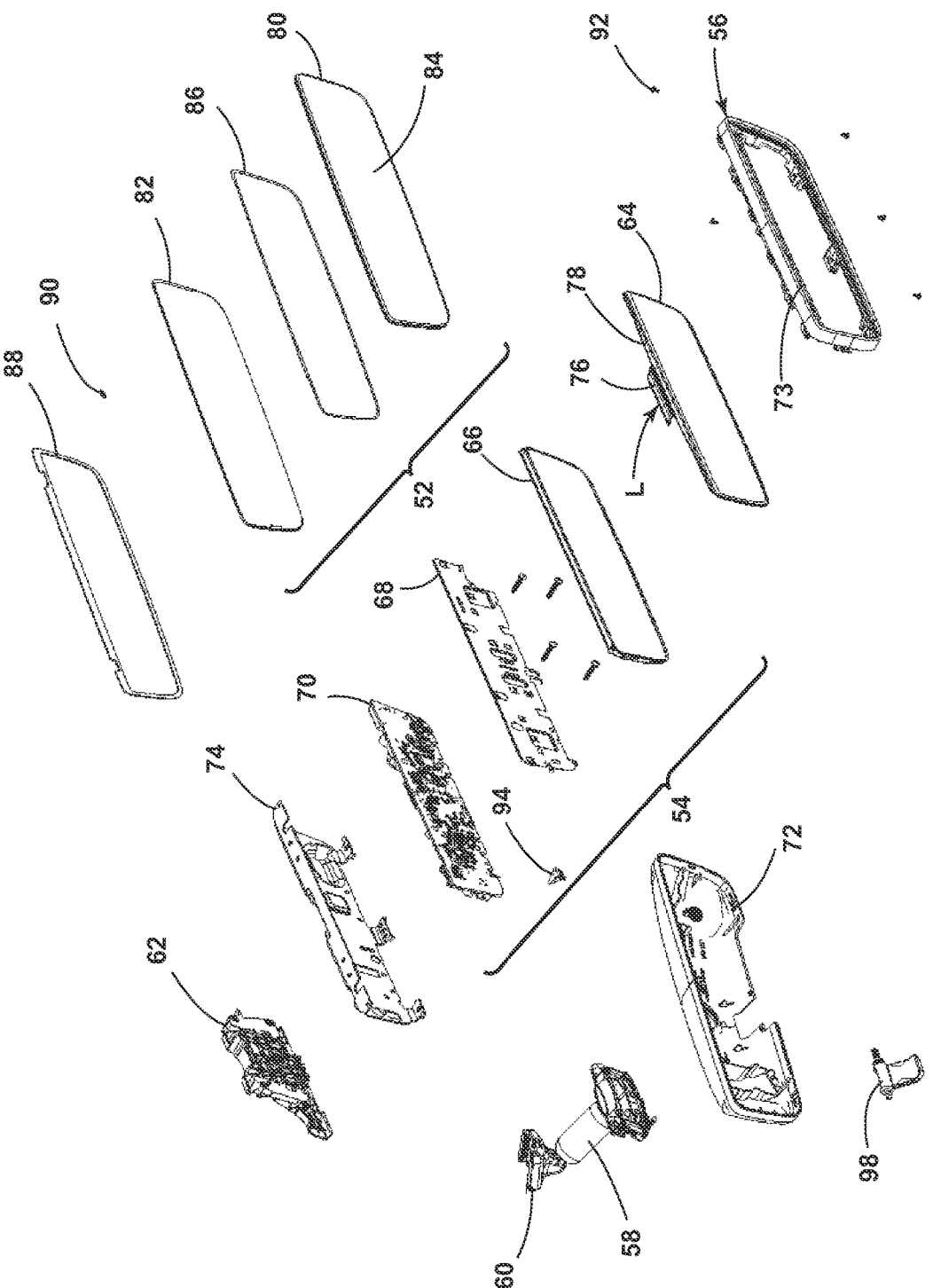
FIG. 4 is a top perspective disassembled view of a full display mirror assembly that houses components of a monitoring system in accordance with an aspect of the present disclosure.

With reference now to FIGS. 3 and 4, the full display rearview mirror assembly 32 may include a partially reflective, partially transmissive element 52 (also referred to as a "glass element" herein). The communication module 16 may include a display assembly 54 that may viewable through the partially reflective, partially transmissive element 52. However, it should be appreciated that the communication module 16 may include additional or alternative components, such as a speaker, a display in locations other than the full display rearview mirror 32, or the like. The full display rearview mirror assembly 32 may further include a bezel assembly 56 that shields and supports the partially reflective, partially transmissive element 52 and the display assembly 54. A mounting member 58 may extend rearward from the bezel assembly 56. The mounting member 58 includes a mount plate 60 and a mounting bracket 62 that is adapted for mounting on a windshield or overhead space of the vehicle 12. The bezel assembly 56 may be configured to be part of the outer profile of the partially reflective, partially transmissive element 52.

With continued reference to FIGS. 3 and 4, the display assembly 54 may comprise several components, including a display 64, an optic block 66, a heat sink 68, and a printed circuit board ("PCB") 70. The PCB 70 may locate various features of the control system 100, such as the processor 104. The full display rearview mirror assembly 32 includes a housing that may include a rear housing 72, a front shield 73, and an intermediate shield 74, which, together, shield and support the partially reflective, partially transmissive element 52 and the display assembly 54. The rear housing 72, the intermediate shield 74, the front shield 73, and components of the display assembly 54 include various retaining features to operably connect the several components of the display assembly 54 with the rear housing 72, the intermediate shield 74, front shield 73, the bezel assembly 56, and each other, and to provide support to the display assembly 54. Specifically, the rear housing 72 includes retaining features to operably connect the rear housing 72 to the intermediate shield 74 and the intermediate shield 74 includes retaining features to operably connect the display assembly 54. The bezel assembly 56 and the front shield 73, likewise, have retaining features to operably connect the bezel assembly 56 and the front shield 73 to the display assembly 54. The retaining features generally include snap-fit connections, tab and slot connections, screw connections, and/or other known retaining features. In some embodiments, the intermediate shield 74 or other portions of the full display rearview mirror assembly 32 may include an ambient light sensor (not shown).

The display 64 may be a liquid crystal display (LCD), a light-emitting diode (LED), an organic light-emitting diode (OLED), plasma, digital light processing (DLP), or other display technology. The display 64 further includes a flexible electrical connector 76, which is operably mechanically and electrically connected with the PCB 70. The flexible electrical connector 76 has a length L that is sufficient to extend over and wrap around the display module components between the display 64 and the PCB 70, and has a width which extends substantially along a top edge 78 of the display 64. Ends of the flexible electrical connector 76 may be chamfered to ease manufacturing. The flexible electrical connector 76, when operably coupled to the PCB 70, aids in securing the components along a top edge 78 of the display assembly 54.

The glass element 52 may include an electro-optic assembly containing an electro-optic medium, which may include a prism-type construction or an electrochromic-type construction. In the prism-type construction, the electro-optic medium may generally include one glass element 52 having an equal or varying thickness from top to bottom. The glass element 52 includes at least two glass substrates, which may include a front substrate 80 as well as a rear substrate 82. The front substrate 80 may include a first surface and a second surface, and the rear substrate 82 may include a third surface and a fourth surface. An electro-optic medium may be disposed between the front substrate 80 and the rear substrate 82. The full display rearview mirror assembly 32 has a viewing area 84 defined by a front surface of the front substrate 80. The viewing area 84 may be a rectangular shape, a trapezoidal shape, or any custom-contoured shape for utilitarian and aesthetic purposes. A border of the glass element 52 may incorporate a concealing layer 86 or edge treatment, such as a chrome ring, an opaque ring, a glass frit, or other similar finish, to conceal a peripheral area of the rear housing 72, the intermediate shield 74, and other elements located behind the glass element 52. A foam adhesive 88 may be connected to an inner side of the glass element 52. A pair of J-clips 90 (or other types of conductors) may electrically couple the glass element 52 to the PCB 70. In the electrochromic-type construction, the electro-optic medium is an electrochromic medium, which includes at least one solvent, at least one anodic material, and at least one cathodic material. Typically, both of the anodic and cathodic materials are electroactive and at least one of them is electrochromic. It will be understood that regardless of its ordinary meaning, the term "electroactive" will be defined herein as a material that undergoes a modification in its oxidation state upon exposure to a particular electrical potential difference. Additionally, it will be understood that the term "electrochromic" will be defined herein, regardless of its ordinary meaning, as a material that exhibits a change in its extinction coefficient at one or more wavelengths upon exposure to a particular electrical potential difference. Electrochromic components, as described herein, include materials whose color or opacity are affected by electric current, such that when an electrical current is applied to the material, the color or opacity changes from a first phase to a second phase. In some embodiments, the first phase is associated with being in a transmissive state, where the display 64 is visible, and the second phase is associated with being in a darkened state, wherein the display 64 is not visible. During assembly, mechanical fasteners 92 may connect the components of the full display rearview mirror assembly 32.

A glare sensor optic 94 may be provided to the bottom side of the rear housing 72, in a location which receives light below the glass element 52 and below the display 64. The glare sensor optic 94 receives light from headlamps of a trailing vehicle, and measures information regarding the likely glare visible on the glass element 52 and communicates this information to the full display rearview mirror assembly 32 so that the full display rearview mirror assembly 32 can be optimized to allow viewing of the display 64 through the glass element 52. The glare sensor optic's 74 optical vertical/horizontal pattern may be symmetrical, so that orientation of the glare sensor optic 94 is not significant (e.g., a circular geometry). The glare sensor optic 94 could also have an asymmetrical vertical/horizontal light gathering pattern, in which case a keyed feature would be put into the lens to verify correct orientation in the full display rearview mirror assembly 32. The glare sensor optic 94 could also be packaged at least partially within the bezel assembly 56 of the full display rearview mirror assembly 32 and have a light guide, which is configured to propagate light to the glare sensor optic 94. The glare sensor optic 94 could also be an imager on a rear portion of the vehicle 12, where a signal representative of the received light is communicated from the glare sensor optic 94 to the full display rearview mirror assembly 32. In some embodiments, the glare sensor optic 94 may include an FDM camera and image processing by components on the PCB 70. An actuator device 98 tilts the glass element 52 relative to the vehicle 12 and/or rear housing 72.

Figure 5:
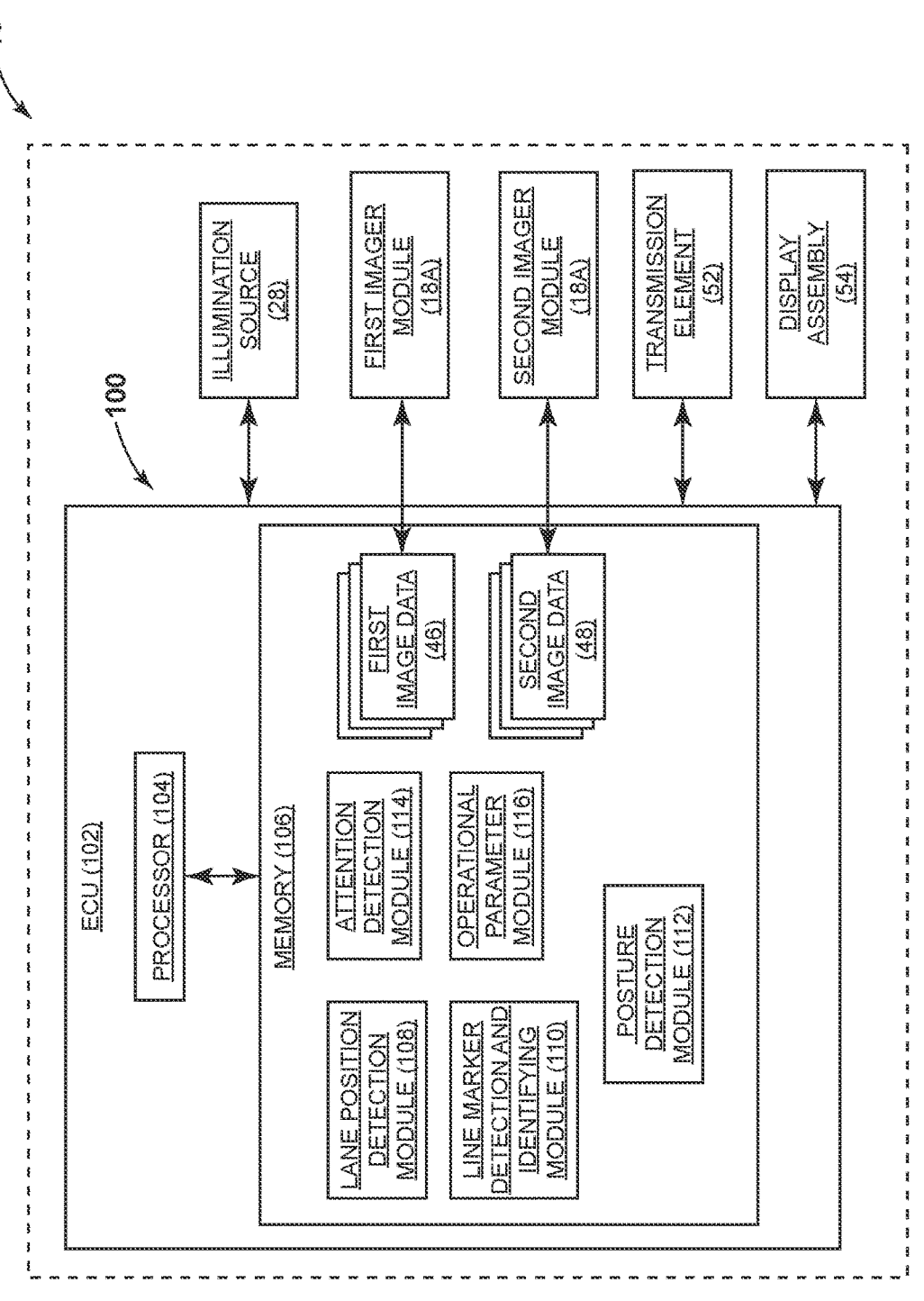
FIG. 5 is a schematic view of a control system for a driver monitoring system according to an aspect of the present disclosure.

With reference now to FIG. 5, the control system 100 of the monitoring system 10 may include at least one electronic control unit (ECU) 102. In some embodiments, some or all of the components of the control system 100 are located in the PCB 70. In some embodiments, the at least one ECU 102 may include the processor 104 and the memory 106. The processor 104 may include any suitable processor 104. Additionally, or alternatively, each ECU 102 may include any suitable number of processors, in addition to or other than the processor 104. The memory 106 may comprise a single disk or a plurality of disks (e.g., hard drives) and includes a storage management module that manages one or more partitions within the memory 106. In some embodiments, memory 106 may include flash memory, semiconductor (solid state) memory, or the like. The memory 106 may include Random Access Memory (RAM), a Read-Only Memory (ROM), Electrically Erasable Programmable Read-Only Memory (EEPROM), or a combination thereof. The memory 106 may include instructions that, when executed by the processor 104, cause the processor 104 to, at least, perform the functions associated with the components of the monitoring system 10. The communication module 16, the at least one imager module 18A, 18B, the illumination source 28, and components of the full display rearview mirror assembly 32 may therefore, be controlled by the control system 100 (e.g., the at least one ECU 102 or processors 104 associated therewith). The memory 106 may therefore, include a lane position detection module 108, a lane marker detection and identifying module 110, a posture detection module 112, an attention detection module 114, and an operational parameter module 116.

With reference now to FIGS. 1-5, the driver monitoring system 10 may be configured to monitor the driver's behavior in the driver's location 22 for the sign of low alertness and generate an alert upon detecting the sign of low alertness. For example, the control system 100 (e.g., the processor 104) may monitor the first image data 46 captured from the driver's location 22 by the first imager module 18A. The posture detection module 112 may include parameters related to the driver posture that indicate the possibility of low alertness, such as head tilt, slouching in a seat, and/or the like. The attention detection module 114 may similarly include parameters related to movement of the driver's eyelids, gaze orientation of the driver, and/or the like related to a driver's attention. In some embodiments, the control system 100 (e.g., the processor 104) is configured to generate the alert audibly. For example, the control system 100 (e.g., the processor 104) may be configured to extract information from the first image data 46 and determine that the driver is not looking at the communication module 16 (e.g., the display 64) via at least one of the posture detection module 112 and/or the attention detection module 114. In response, the control system 100 (e.g., the processor 104) may generate the alert audibly. In other scenarios, the control system 100 (e.g., the processor 104) may be configured to extract information from the first image data 46 and determine that the driver is looking at the communication module 16 (e.g., the display 64) but is still exhibiting signs of low alertness, in response, the control system 100 (e.g., the processor 104) may generate the alert visually at first and subsequently audibly if no corrective action is taken by the driver. In other scenarios it may be beneficial to initially or simultaneously generate the alert audibly to draw the driver's attention to the display 64 where more specific information (e.g., graphics, text, etc.) can be provided that provide further details on corrective actions.

With continued reference to FIGS. 1-5, driver monitoring system 10 may likewise, be configured to simultaneously monitor the lane position 20 of the vehicle 12 for the sign of driving behaviors associated with low alertness and generate an alert. For example, the control system 100 (e.g., the processor 104) may monitor the second image data 48 captured of an exterior 38 of the vehicle 12 by the second imager module 18B. The lane position detection module 108 may include parameters related to the lane position 20 of the vehicle 12 that indicate the possibility of low alertness, such as merging towards a boundary of the lane when a vehicle is present, merging towards a boundary of the lane without a turn signal, and/or the like. The lane marker detection and identifying module 110 may include parameters related to detecting and identifying the lane markers including central markers, edge markers, and whether a marker is associated with a passing lane or a non-passing lane. Accordingly, the driver monitoring system 10 may be configured to detect driving behaviors associated with one or more signs of low alertness and generate the alert to the driver. The alert may be audible, visible (e.g., via the display 64), individually, in sequence as described above, or simultaneously.

With still continued reference to FIGS. 1-5, in some embodiments, the control system 100 (e.g., the processor 104) may be configured to generate an alert only if both the lane position 20 and the driver's behavior (e.g., attention and drowsiness) indicate the sign of low alertness. In some embodiments, the control system 100 (e.g., the processor 104) may be configured to generate a first alert if the lane position 20 indicates the sign of low alertness, a second alert if the driver's behavior indicates the sign of low alertness, and a third alert if the lane position 20 and the driver's behavior both indicate the sign of low alertness. In some embodiments, the first alert, the second alert, and the third alert are different. In some embodiments, the differences between the alerts may be audible. For example, the differences may include varying the volume, frequency of the alert, or voice commands. In some embodiments, the differences between the alerts may be visual. For example, the differences may include generating different textual messages, displaying images (e.g., of the first image data 46 or the second image data 48). In some embodiments, the differences may be audible and visual. Further, it should be appreciated that in embodiments where the full display rearview mirror assembly 32 incorporates an electro-optic component, the control system 100 (e.g., the processor 104) may be configured to automatically switch the electro-optic medium to the transmissive state, such that the display 64 is viewable.

In some embodiments, the various alerts may correspond to urgency/severity of the low alertness situation. For example, if the lane position 20 of the vehicle 12 indicates merging towards another vehicle, the alert may be louder or have a higher frequency than in scenarios where the lane position 20 of the vehicle 12 indicates merging towards a lane without another vehicle. Likewise, in a scenario where the lane position 20 of the vehicle 12 indicates merging towards a lane without another vehicle and also that the driver is showing signs of low alertness, the alert may be louder than if the driver was displaying signs of an acceptable level of alertness. In some embodiments, scenarios of the lane position 20 of the vehicle 12 that can be attributed to low alertness may be always associated with visual alerts (e.g., generating images of the encroaching lane from the second image data 48) and an additional audible alert only when the driver is displaying behavior of low alertness (e.g., as extrapolated from the first image data 46). Likewise, in some embodiments, the driver's behavior (e.g., attention and drowsiness) may be associated with audible alerts and an additional visual alert only when the lane position 20 of the vehicle 12 that can be attributed to low alertness.

In some embodiments, the control system 100 (e.g., the processor 104) may be configured to monitor one of the driver's behavior or the lane position 20 and, upon a determination that one of the driver's behavior or the lane position 20 includes the sign of low alertness, generate one of a visual alert or an audible alert and monitor the other of the driver's behavior or the lane position 20 for the sign of low alertness where, if detected, the other of the visual and audible alert is generated. In still further embodiments, the control system 100 (e.g., the processor 104) may be configured to monitor one of the driver's behavior or the lane position 20 and, upon a determination that one of the driver's behavior or the lane position 20 includes the sign of low alertness, generate an audible alert and monitor the other of the driver's behavior or the lane position 20 for the sign of low alertness where, if detected, increase the volume or frequency of the audible alert.

The disclosure herein is further summarized in the following paragraphs and is further characterized by combinations of any and all of the various aspects described therein.

According to one aspect of the present disclosure, a driver monitoring system for a vehicle includes a communication module, and at least one imager module in operable communication with the communication module that is configured to capture a lane position of the associated vehicle and a driver's behavior. A processor receives the captured lane position and the captured driver's location from the at least one imager module. A memory includes instructions that, when executed by the processor, cause the processor to monitor the captured lane position and the captured driver's behavior for a sign of low alertness of the driver and generate an alert with the communications module upon detecting the sign of low alertness.

According to another aspect, a sign of low alertness of a driver's behavior includes a behavior associated with a driver's eyes and a sign of low alertness of a lane position includes a proximity of an associated vehicle to a lane marker.

According to another aspect, a behavior associated with a driver's eyes includes a gaze direction being different than a movement direction of a vehicle towards a lane marker.

According to another aspect, a driver monitoring system is at least partially located in a full display mirror assembly.

According to another aspect, a processor is located in a full display mirror assembly.

According to another aspect, a communication module includes a display located in a full display mirror assembly.

According to yet another aspect, at least one imager module includes a first imager module oriented towards a driver's location and a second imager module oriented towards an exterior of a vehicle.

According to still yet another aspect, an illumination source is configured to generate an illumination within an infrared spectrum toward a driver's location.

According to another aspect of the present disclosure, a driver monitoring system for a vehicle includes a communication module, a first imager module, and a second imager module. The first imager module is configured to capture a driver's behavior, and the second imager module is configured to capture a lane position of an associated vehicle. A processor receives the captured lane position and the captured driver's behavior from the first and second imager modules. A memory including instructions that, when executed by the processor, cause the processor to simultaneously monitor the captured lane position and the captured driver's behavior for a sign of low alertness of the driver, and generate one of a plurality of different alerts upon detecting the sign of low alertness, each alert in the plurality of different alerts associated with severity of the sign of low alertness.

According to another aspect, a sign of low alertness of a driver's behavior includes a behavior associated with at least one of misplaced attention or drowsiness and a sign of low alertness of a lane position includes a proximity of an associated vehicle to a lane marker.

According to yet another aspect, a processor is configured to generate a first alert of a plurality of different alerts upon detecting a sign of at least one of misplaced attention or drowsiness, and generate a second alert of a plurality of different alerts upon detecting a proximity of an associated vehicle to a lane marker.

According to still yet another aspect, a first alert is audible.

According to another aspect, a second alert is visual.

According to yet another aspect, a processor is configured to generate a third alert of a plurality of different alerts upon detecting both a sign of at least one of misplaced attention or drowsiness, and a proximity of an associated vehicle to a lane marker.

According to still yet another aspect, a third alert is both audible and visual.

According to another aspect, a visual aspect of a third alarm is generated on a display located at least partially within a full display mirror assembly.

According to yet another aspect, a processor is located within a full display mirror assembly.

According to yet another aspect of the present disclosure, a driver monitoring system for a vehicle includes a communication module and at least one imager module in operable communication with the communication module and configured to capture a lane position of the associated vehicle and a driver's behavior. A light source is configured to generate an illumination within the infrared spectrum directed towards the driver that is captured by the at least one imager module. A processor receives the captured lane position and the captured driver's behavior from the at least one imager module. A memory includes instructions that, when executed by the processor, cause the processor to monitor the captured lane position and the captured driver's behavior for a sign of low alertness of the driver. The processor further generates a first alert upon detecting the sign of low alertness of the captured driver's behavior, and generates a second alert that is different than the first alert upon detecting a sign of low alertness in the captured lane position.

According to another aspect, a light source is configured to generate an illumination is sequenced with at least one imager module.

According to yet another aspect, a sign of low alertness in a captured lane position includes at least one of changing lanes without a turn signal, a type of lane marker an associated vehicle is encroaching, merging into a lane with a detected vehicle, or merging into a lane when a captured driver's behavior includes a sign of low alertness.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes, and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

The above description is considered that of the illustrated embodiments only. Modifications of the device will occur to those skilled in the art and to those who make or use the device. Therefore, it is understood that the embodiments shown in the drawings and described above are merely for illustrative purposes and not intended to limit the scope of the device, which is defined by the following claims as interpreted according to the principles of patent law, including the Doctrine of Equivalents.

What is claimed is:

1. A driver monitoring system for a vehicle comprising:
a communication module including a display;
at least one imager module in operable communication with the communication module and configured to capture a lane position of an associated vehicle, a lane marker, and a driver's behavior;
a processor receiving the captured lane position and the captured driver's behavior from the at least one imager module; and
a memory including instructions that, when executed by the processor, cause the processor to:
characterize the lane marker as a passing lane marker or a non-passing lane marker;
simultaneously monitor the captured lane position and the captured driver's behavior for a sign of low alertness of the driver including if the driver is looking at the display; and
generate one of a plurality of different alerts upon detecting the sign of low alertness, each alert in the plurality of different alerts associated with severity of the sign of low alertness and if the driver is looking at the display.

2. The driver monitoring system of claim 1, wherein the sign of low alertness of the driver's behavior includes a behavior associated with a driver's eyes and the sign of low alertness of the lane position includes a proximity of the associated vehicle to a lane marker and the characterization that the lane marker is the non-passing lane marker.

3. The driver monitoring system of claim 2, wherein the behavior associated with the driver's eyes includes a gaze direction being different than a movement direction of the vehicle towards the lane marker.

4. The driver monitoring system of claim 1, wherein the driver monitoring system is at least partially located in a full display mirror assembly.

5. The driver monitoring system of claim 4, wherein the processor is located in the full display mirror assembly.

6. The driver monitoring system of claim 4, wherein the display is located in the full display mirror assembly.

7. The driver monitoring system of claim 1, wherein the at least one imager module includes a first imager module oriented towards a driver's location and a second imager module oriented towards an exterior of the vehicle.

8. The driver monitoring system of claim 7, including an illumination source configured to generate a structured light illumination within an infrared spectrum towards the driver's location, and the control system is configured to extract three-dimensional information from the captured driver's behavior under the principles of Time-of-Flight.

9. A driver monitoring system for a vehicle comprising:
a communication module including a display;
a first imager module configured to capture a driver's behavior;
a second imager module configured to capture a lane position of an associated vehicle;
a processor receiving the captured lane position and the captured driver's behavior from the first and second imager modules; and
a memory including instructions that, when executed by the processor, cause the processor to:
simultaneously monitor the captured lane position and the captured driver's behavior for a sign of low alertness of the driver including if the driver is looking at the display; and
generate one of a plurality of different alerts upon detecting the sign of low alertness, each alert in the plurality of different alerts associated with severity of the sign of low alertness and if the driver is looking at the display.

10. The driver monitoring system of claim 9, wherein the sign of low alertness of the driver's behavior includes a behavior associated with at least one of misplaced attention or drowsiness and the sign of low alertness of the lane position includes a proximity of the associated vehicle to a lane marker.

11. The driver monitoring system of claim 10, wherein the processor is further configured to:
generate a first alert of the plurality of different alerts upon detecting the sign of at least one of misplaced attention or drowsiness; and
generate a second alert of the plurality of different alerts upon detecting the proximity of the associated vehicle to the lane marker.

12. The driver monitoring system of claim 11, wherein the first alert is visual on the display if the driver is looking at the display and the first alert is audible if the driver is not looking at the display.

13. The driver monitoring system of claim 12, wherein the second alert is visual.

14. The driver monitoring system of claim 11, wherein the processor is further configured to:
generate a third alert of the plurality of different alerts upon detecting both the sign of at least one of misplaced attention or drowsiness, and the proximity of the associated vehicle to the lane marker.

15. The driver monitoring system of claim 14, wherein the third alert is both audible and visual.

16. The driver monitoring system of claim 15, wherein a visual aspect of the third alert is generated on the display and the display is located at least partially within a full display mirror assembly.

17. The driver monitoring system of claim 16, wherein the audible alert is generated by a speaker located within the full display mirror assembly.

18. A driver monitoring system for a vehicle comprising:
a communication module including a display and an
electro-optic assembly switchable between a first state
wherein the display is not visible and a transmissive
state wherein the display is visible;
at least one imager module in operable communication
with the communication module and configured to
capture a lane position of an associated vehicle and a
driver's behavior;
a light source configured to generate an illumination
within an infrared spectrum directed towards the driver
that is captured by the at least one imager module;
a processor receiving the captured lane position and the
captured driver's behavior from the at least one imager
module; and
a memory including instructions that, when executed by
the processor, cause the processor to:
simultaneously monitor the captured lane position and
the captured driver's behavior for a sign of low
alertness of the driver including if the driver is
looking at the display;
generate a first alert upon detecting the sign of low
alertness of the captured driver's behavior, and generate a second alert that is different than the first alert
upon detecting a sign of low alertness in the captured
lane position; and
wherein at least one of the first alert and the second
alert are a visual alert and the control system is
configured to switch the electro-optic assembly to
the transmissive state and generate the visual alert on
the display if the driver is looking at the display and
an audible alert if the driver is looking away from the
display.

19. The driver monitoring system of claim 18, wherein the
light source is configured to generate the illumination is
sequenced with the at least one imager module.

20. The driver monitoring system of claim 18, wherein the
sign of low alertness in the captured lane position includes
at least one of changing lanes without a turn signal, a type
of lane marker the associated vehicle is encroaching, merg-
ing into a lane with a detected vehicle, or merging into a lane
when the captured driver's behavior includes a sign of low
alertness.

* * * * *